July 27, 1965  S. J. SCHANTZ  3,196,971
POWER MOWER WITH GEAR DRIVEN STEERING MECHANISM
Filed May 31, 1961  2 Sheets-Sheet 1
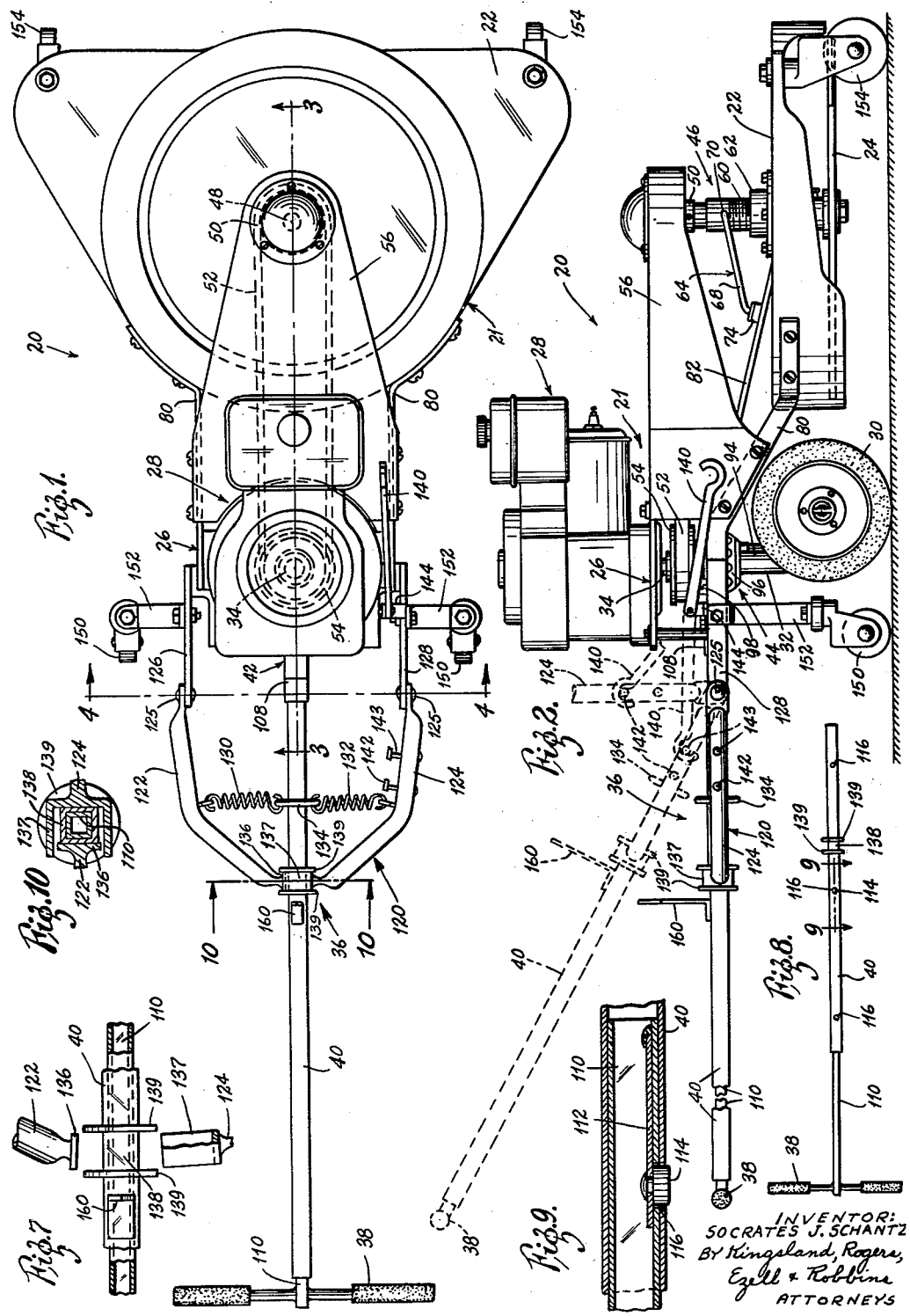
INVENTOR:
SOCRATES J. SCHANTZ
BY Kingsland, Rogers,
Ezell & Robbins
ATTORNEYS

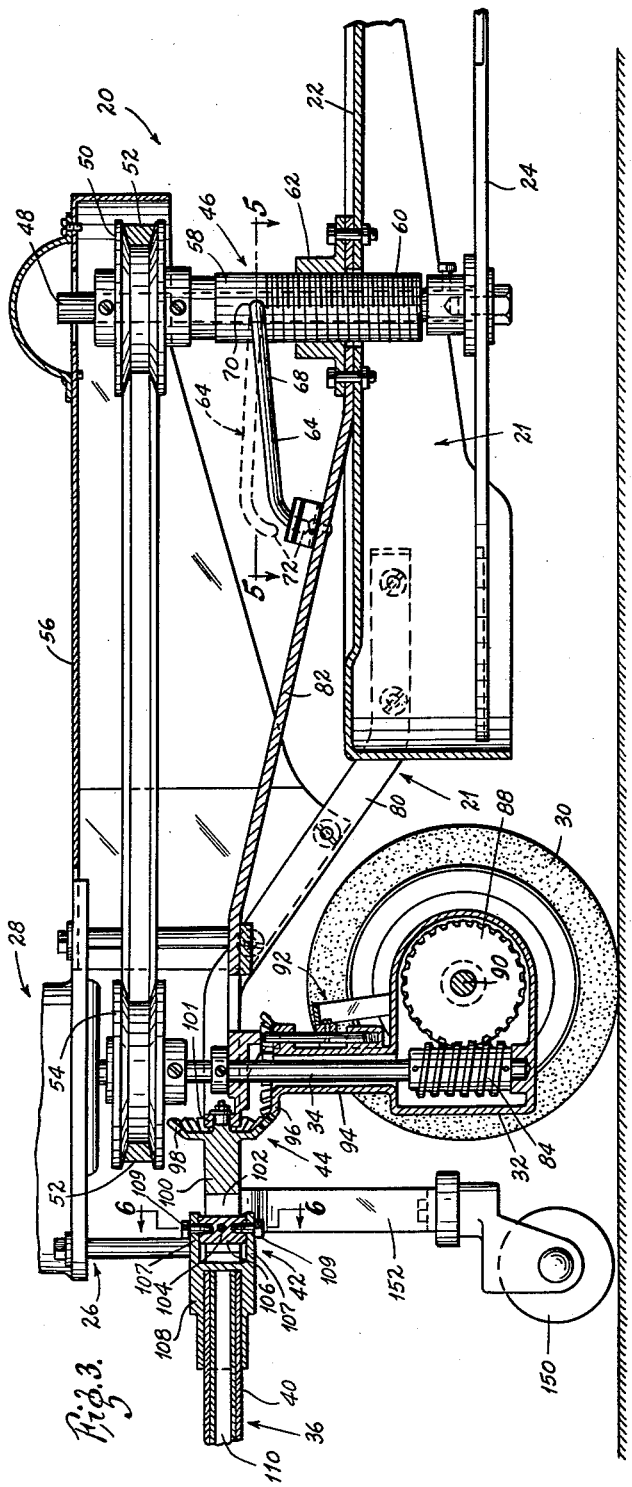

United States Patent Office 3,196,971
Patented July 27, 1965

3,196,971
POWER MOWER WITH GEAR DRIVEN
STEERING MECHANISM
Socrates J. Schantz, Box 134, Marine, Ill.
Filed May 31, 1961, Ser. No. 113,889
5 Claims. (Cl. 180—19)

This invention relates to improvements in power mowers and in particular is concerned with improvements in steering gear mechanisms for wheel driven power mowers and for means for adjusting the height level of the rotary cutting blade.

The instant application is a continuation-in-part of my prior copending application, Serial No. 75,703, filed December 14, 1960, now United States Patent No. 3,029,887, granted April 17, 1962. This parent application concerned a power mower having gear driven wheels with means for steering these wheels through a driven position and a gear disengaged position accomplished through a clutching mechanism. The clutching mechanism forms no portion of this invention and the improvement of the instant application is drawn to the steering mechanism and other features of the mower, including a height level adjustment for the rotary cutting blade.

By means of this invention there has been provided a steering handle having a steering shaft provided with a universal joint connected with gearing means engaging a housing carrying the gear driven wheels. By this means the steering shaft may be raised or lowered and also turned while still providing steering motion as the steering shaft is rotated to impart steering direction through the housing to the wheels which are carried by the housing. As a further feature of this invention, the engine is mounted directly over the gear driven wheels to provide for more efficient power take-off and also to provide for better traction by locating the major portion of the weight of the mower directly over said wheels.

By means of the above features the power mower of this invention may be very simply operated in any desired fashion. Adjustment of the blade may be very simply effected and the device is rugged and simple to maintain and repair.

The above are objects of this invention and further objects will appear in the detailed description which follows and will be otherwise apparent to those skilled in the art.

For the purpose of illustration of this invention there is shown a preferred embodiment in the accompanying drawings. It is to be understood that these drawings are for the purpose of example only and that the invention is not limited thereto.

In the drawings:

FIGURE 1 is a plan view of the power mower;

FIGURE 2 is a view in side elevation of the power mower of FIGURE 1 with the handle being partly broken away;

FIGURE 3 is an enlarged view in section taken on the line 3—3 of FIGURE 1 showing details of construction of the steering mechanism and the blade adjustment device;

FIGURE 4 is an enlarged view in section taken on the line 4—4 of FIGURE 1 showing details of the steering mechanism and the power driven wheels;

FIGURE 5 is a view in section on line 5—5 of FIGURE 3 showing further details of construction of the adjustment device for the mower blade;

FIGURE 6 is a view in section taken on line 6—6 of FIGURE 3 showing details of construction of the universal joint used for the steering shaft;

FIGURE 7 is an enlarged view of the yoke construction for securing the steering shaft;

FIGURE 8 is a reduced plan view showing a telescoping feature of the steering shaft;

FIGURE 9 is an enlarged view in section taken on line 9—9 of FIGURE 8 showing a detent button and locking device for telescoping the shaft in various positions; and FIGURE 10 is a view in cross-section taken on the line 10—10 of FIGURE 1 showing the details of the contacting relationship between the yoke arms and the steering shaft.

The power mower of this invention is generally identified by the reference numeral 20 in FIGURES 1, 2 and 3. As there shown it is comprised of a body 21 consisting of base 22 for mounting a mower blade 24 and super-structure 26 connected to the base, and an engine 28 mounted upon the super-structure.

Gear driven wheels 30 are supported in a housing 32 and are powered by a gear shaft 34 connected to the engine. The steering mechanism is generally indicated by the reference numeral 36, and is comprised of a telescopic handle 38 and a steering shaft 40 connected by a universal joint 42 through steering gear means 44 connecting the shaft to the wheel housing.

The blade adjustment device is generally indicated by reference numeral 46, and is best shown in FIGURES 2, 3 and 5. As there shown, it comprises the mower blade 24, which is connected by power shaft 48 to a pulley 50. The pulley 50 in turn is connected by a pulley belt 52 to a pulley 54 that is secured to the engine power shaft 34. A protective shroud 56 encloses the pulley belt and the pulley 50.

The power shaft for the rotary blade is journaled within a bearing 58 that has external threads. 60. The bearing 58 is threadedly received within a support block 62 mounted upon the base 22. In this fashion the bearing 58 may be screwed up and down within the support block 62 to vary the height level of the mower blade.

An adjustment handle 64, which is best shown in FIGURE 5, and which is comprised of two arms 66 and 68, is fitted into openings 70 in the side of the bearing. The handle is of a spring-like nature so as to be retained at the ends within the openings of the bearing. As shown in FIGURE 5 an enlarged stop element or knob 72 is provided which may be pressed into a spring clip lock 74. In this manner the handle may be retained in firm relationship once the adjustment of the blade has been effected.

The super-structure 26 is connected to the mower base 22 by means of side braces 80 and a center brace 82. This super-structure forms the means for mounting the engine 28 and the shroud for the pulley belt and the blade pulley in the manner aforedescribed. The wheel housing 32 supports and encloses the power shaft 34 extending downwardly from the engine through the super-structure and into the housing and terminating in a worm gear 84. Power is imparted to the gear driven wheels 30 by means of gear 88 meshing with the worm gear. The gear 88 is secured to axle 90 journaled within the housing and connecting the power driven wheels.

A clutching mechanism, generally identified by the reference numeral 92, provides that when the wheels are turned in a certain direction they are gear driven, while when turned in another direction they are engaged from the gearing, but does not form part of the instant invention. The clutching mechanism is more fully disclosed in applicant's prior copending application, Serial No. 75,703, filed December 14, 1960, now United States Patent No. 3,029,887, granted April 17, 1962.

The stearing gear means 44 for turning the housing and the gear driven wheels is best shown in FIGURE 3. As there shown, it comprises a cylindrical extension 94 which is of a tubular nature and encloses a portion of the gear shaft 34. The cylindrical extension 94 terminates in a rim forming a bevel gear 96. Another bevel gear 98 is connected to the end of the steering shaft 40 by a connector element 100, and is rotatably pinned to a hub 101 mounted upon the super-structure. The connector element 100 has a pair of bifurcated extensions 102 which are connected to and form part of the universal joint 42. Thus, a pin 104 passes through the elements 102 and forms a shaft for mounting a bearing block 106. The bearing block 106 in turn is secured to extensions 107 of a sleeve 108 having a square shaped cross-section which holds the end of the steering shaft 40 in loose fitting relation. Cap screws 109 having unthreaded shank portions are employed for this purpose. By means of this construction the steering shaft 40 may be raised or lowered about the pin 104 as shown in FIGURE 2.

The steering shaft 40 may also be adjusted in telescope relation by means of the structure shown in FIGURES 8 and 9. Thus, as there shown, the handle 38 has a square shaft 110 which telescopes within the steering shaft 40. The interior of the shaft 110 is provided with a leaf spring 112 and a detent button 114. The detent button 114 is engageable with holes 116 provided along the shaft 40 so that telescoped arrangement for shortening or lengthening may be easily provided for proper adjustment.

A steering shaft yoke 120 is provided for stabilizing the steering shaft 40, and this construction is best shown in FIGURES 1 and 7. The yoke 120 is formed of a pair of semi-rigid yoke arms 122 and 124, which are pivotally connected by pins 125 to extensions 126 and 128 attached to the super-structure as best shown in FIGURE 1. The arms, although semi-rigid, have a slight degree of flex so that the ends may be moved toward or away from one another. Each of the yoke arms may be spread apart, but are tensioned toward one another by a pair of springs 130 and 132 secured at one end to each of the yoke arms and connected to each other through a ring 134. The shaft 40 fits loosely within the ring which serves only to connect the springs. The ends of the yoke arms are provided with shoes 136 and 137 which are biased toward one another to engage against a square shaft portion 138 between guide flanges 139 to hold the shaft in central alignment with the axis of the machine as viewed in FIGURE 1, and the four operating positions, right, left, forward, and reverse, said reverse position being free wheeling. These operating positions are effected by rotating the shaft on its axis as viewed in FIGURE 1. The shoe 137, as shown in FIGURE 7, is U-shaped and slightly larger than the square shaft portion so turning of the shaft can be accommodated to the self-centering four operating positions. The four self-centering operating positions are effected by alignment of one of the four sides of the shaft into contacting position with the shoe 136. This is effected by spacing the legs of the U-shaped shoe 137 slightly further apart than the length of the diagonal between the sides of the square shaft. This construction is best shown in FIGURE 10. It will be understood that the shaft 40 may be simply disengaged from the mower by spreading the yoke 120 and slipping the steering shaft 40 out of the universal joint sleeve 108 within which it is loosely held. Thus, where the mower is desired to be stored in a confined space, disassembly can be simply effected.

The steering shaft 40 may also be provided with a stop latch 140 as shown in FIGURES 1 and 2. This stop device comprises two studs 142 and 143 mounted upon the yoke 124 and a latch or hook 140 which fits over the studs. The latch is pivotally supported from a mounting plate 144 attached as an extension to the super-structure as best shown in FIGURE 1. Thus, as shown in FIGURE 2, the handle may assume either of the positions shown in the dotted lines by attaching the latch to stud 142 or 143. When latch 140 is disengaged the steering handle may fall to the position shown in the full body lines or rest against the ground at the handle end, or may be leaned against the engine by rotating it to the full clockwise position as viewed in FIGURE 2. It will also be understood that a hook of adjustable length may be employed.

For stability purposes, outrigger wheels 150 may be provided. These wheels are supported from outrigger braces 152 extending from the super-structure and provide stability for the mower. The outrigger wheels and the gear driven wheels, together with the front wheels 154, mounted at the front of the mower base, form the wheels used in the mower structure, with it being understood that the outrigger wheels are for stability purposes.

*Operation*

The mower of this invention is very simply operated. The mowing blade adjustment device is simply employed by raising the handle 64 from the position shown in full lines in FIGURE 3 where it is locked to the position shown in dotted lines. Then it may be rotated in one direction or the other, depending upon whether the blade is desired to be raised or lowered. After the desired adjustment has been made, with it being understood that one full complete revolution is required, the handle is again locked by pressing the knob into the spring clip lock 74.

The mower is then ready for operation. With the engine running, the handle 38 is turned to any desired position to vary the alignment of the gear driven wheels 30. In the position shown in the drawings, the mower will move straight ahead. To indicate the direction of movement, a pointer 160 is employed for a ready indication of the direction.

To move to the left, the handle is rotated by turning it within the shoes 136 and 137, looking at it from the operator's viewpoint, counterclockwise. This movement causes the rotation of the steering shaft 40 and, through the action of the universal joint 42, the rotation of the connector 100 and the gear 98. As gear 98 meshes with the gear 96, formed on the rim of the cylindrical extension of the wheel housing, the wheel housing will also turn. This movement does not effect the movement of the engine power shaft 34, but, of course, turns the gear driven wheels 30 in the desired direction.

For a reverse steering movement of the gear driven wheels, in other words to the right hand direction, the steering handle is moved in the clockwise direction. The aforedescribed steering operations can be very simply employed by merely turning the steering handle just as one would turn a steering wheel of a car and no further operation is required. Self centering in the right or left handed direction is automatically provided by the squared configuration of the handle and the yoke shoes.

It will also be understood that when the steering handle is turned to a certain position, namely the reverse position where the pointer 160 points downwardly, the clutch mechanism disengages the gear driven wheels from the power shaft so that the mower may be used manually. The disengaged position may be preferred for starting. This clutch mechanism is more fully described in my copending aplication, Serial No. 75,703 now United States Patent No. 3,029,887, granted April 17, 1962.

At the completion of the mowing operation, which takes place in the usual fashion, the steering handle may be very simply disengaged from the mower. This is effected by spreading apart the yoke arms 122 and 124 as shown in FIGURE 7 to disengage the shoes from the square sleeve 138 upon the steering shaft. Once this has been effected, the steering shaft 40 may be withdrawn from the universal joint sleeve 108 within which it is loosely held. The mower may then be stored in any confined place with the handle placed beside it.

Various changes and modifications may be made within this invention as will be apparent to those skilled in the art. Such changes and modifications are within the scope and teaching of this invention as defined by the claims appended hereto.

What is claimed is:

1. A power mower having a body, a pair of wheels driven by a power shaft, a housing for drive means for said wheels and shaft, said housing being rotatably mounted with respect to said body, and means for steering said driven wheels comprising a cylindrical extension of said housing coaxial with and enclosing a portion of said power shaft, a steering handle and steering shaft and steering gear means engaging the end of the steering shaft with an end of said cylindrical extension of the housing, said steering shaft being loosely journaled at its forward end within said steering gear means, and means for supporting said shaft in four selected rotation positions comprising a yoke pivotally connected to the body of the power mower and consisting of a pair of oppositely disposed yoke arms terminating in shoes engageable in biased and loosely mating relation with a squared section of said shaft.

2. A power mower having a body, a pair of wheels driven by a power shaft, a housing for drive means for said wheels and shaft, said housing being rotatably mounted with respect to said body, and means for steering said driven wheels comprising a cylindrical extension of said housing coaxial with and enclosing a portion of said power shaft, a steering handle and steering shaft and steering gear means engaging the end of the steering shaft with an end of said cylindrical extension of the housing, said steering shaft being loosely journaled at its forward end within said steering gear means, and means for supporting said shaft in selected rotation positions comprising a yoke pivotally connected to the body of the power mower and consisting of a pair of oppositely disposed yoke arms terminating in shoes engageable in biased and loosely mating relation with a squared section of said shaft, and sleeve means upon said shaft receiving said shoes to define a path of rotation between the shoes and said shaft and hold the shaft in alignment.

3. A power mower having a body, a pair of wheels driven by a power shaft, a housing for drive means for said wheels and shaft, said housing being rotatably mounted with respect to said body, and means for steering said driven wheels comprising a cylindrical extension of said housing coaxial with and enclosing a portion of said power shaft, a steering handle and steering shaft and steering gear means engaging the end of the steering shaft with an end of said cylindrical extension of the housing, said steering shaft being loosely journaled at its forward end within said steering gear means, and means for supporting said shaft in selected rotation positions comprising a yoke pivotally connected to the body of the power mower and consisting of a pair of oppositely disposed yoke arms terminating in shoes having perpendicular intersecting faces engageable in biased and loosely mating relation with a squared section of said shaft to provide four biased steering positions of the shaft, and a pointer extending perpendicularly from said shaft indicating the steering position.

4. A power mower having a body, a pair of wheels driven by a power shaft, a housing for drive means for said wheels and shaft, said housing being rotatably mounted with respect to said body, and means for steering said driven wheels comprising a cylindrical extension of said housing coaxial with and enclosing a portion of said power shaft, a steering handle and steering shaft and steering gear means engaging the end of the steering shaft with an end of said cylindrical extension of the housing, said steering shaft being loosely journaled at its forward end within said steering gear means, and means for supporting said shaft in selected rotation positions comprising a yoke pivotally connected to the body of the power mower and consisting of a pair of oppositely disposed yoke arms terminating in shoes having perpendicular intersecting faces engageable in biased and loosely mating relation with a squared section of said shaft to provide four biased steering positions of the shaft, and a pointer extending perpendicularly from said shaft indicating the steering position, and sleeve means upon said shaft receiving said shoes to define a path of rotation between the shoes and said shaft and hold the shaft in alignment.

5. A power mower having a body, a pair of wheels driven by a power shaft, a housing for drive means for said wheels and shaft, said housing being rotatably mounted with respect to said body, and means for steering said driven wheels comprising a cylindrical extension of said housing coaxial with and enclosing a portion of said power shaft, a steering handle and steering shaft and steering gear means engaging the end of the steering shaft with an end of said cylindrical extension of the housing, said steering shaft being disengageable at its forward end with said power mower and means for supporting it in an engaged position comprising a yoke consisting of a pair of yoke arms, said arms having opposed bearing surfaces at one end and being connected to the body at the other end and means biasing said bearing surfaces into bearing relationship with said shaft, said means comprising a pair of springs, each spring being connected at one end to a separate yoke arm and connected at an opposed end to a ring loosely enclosing said shaft.

References Cited by the Examiner

UNITED STATES PATENTS

| | | | |
|---|---|---|---|
| 1,428,231 | 9/22 | Hicks | 180—19 |
| 1,737,568 | 12/29 | Burris | 180—13 |
| 1,878,375 | 9/32 | Cache | 180—70 X |
| 1,992,494 | 2/35 | Lundin | 56—25.4 |
| 2,243,133 | 5/41 | Steiner et al. | 56—25.4 |
| 2,327,583 | 8/43 | Framhein | 180—19 |
| 2,329,185 | 9/43 | Coddington | 56—25.4 |
| 2,565,044 | 8/51 | Puls | 56—25.4 |
| 2,582,177 | 1/52 | Swisher et al. | 180—19 |
| 2,731,096 | 1/56 | Thelander | 180—19 |
| 2,899,793 | 8/59 | Swisher | 56—25.4 |
| 2,968,902 | 1/61 | Brown | 56—25.4 |

FOREIGN PATENTS

| | | |
|---|---|---|
| 1,061,940 | 12/43 | France. |
| 973,225 | 1/60 | Germany. |

A. HARRY LEVY, *Primary Examiner.*

CARL W. ROBINSON, BENJAMIN HERSH,
*Examiners.*